US011575715B2

(12) United States Patent
Llamas Virgen et al.

(10) Patent No.: US 11,575,715 B2
(45) Date of Patent: Feb. 7, 2023

(54) DYNAMICALLY CUSTOMIZED COGNITIVE SECURITY FILTER

(71) Applicant: International Business Machines Corporation, Armonk, NY (US)

(72) Inventors: Paul Llamas Virgen, Zapopan (MX); Humberto Orozco Cervantes, Tonalá (MX); Carolina Garcia Delgado, Zapopan (MX)

(73) Assignee: International Business Machines Corporation, Armonk, NY (US)

( * ) Notice: Subject to any disclaimer, the term of this patent is extended or adjusted under 35 U.S.C. 154(b) by 546 days.

(21) Appl. No.: 16/665,215

(22) Filed: Oct. 28, 2019

(65) Prior Publication Data

US 2021/0126952 A1     Apr. 29, 2021

(51) Int. Cl.
*H04L 9/40*            (2022.01)

(52) U.S. Cl.
CPC .......... *H04L 63/205* (2013.01); *H04L 63/102* (2013.01); *H04L 63/168* (2013.01)

(58) Field of Classification Search
CPC ... H04L 63/205; H04L 63/102; G06F 21/577; H04W 12/37
See application file for complete search history.

(56) References Cited

U.S. PATENT DOCUMENTS

| | | | |
|---|---|---|---|
| 6,226,745 B1 | 5/2001 | Wiederhold | |
| 7,380,279 B2 | 5/2008 | Prokupets et al. | |
| 7,797,732 B2 | 9/2010 | Tam et al. | |
| 7,949,611 B1 | 5/2011 | Nielsen et al. | |
| 8,276,207 B2 | 9/2012 | Walsh et al. | |
| 2013/0191887 A1 | 7/2013 | Davis et al. | |
| 2014/0007247 A1 | 1/2014 | Carter et al. | |
| 2015/0050922 A1* | 2/2015 | Ramalingam | H04W 4/50 455/418 |

(Continued)

FOREIGN PATENT DOCUMENTS

| | | |
|---|---|---|
| CN | 103037306 A | 4/2013 |
| CN | 103345530 A | 10/2013 |

(Continued)

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

(Continued)

*Primary Examiner* — Michael R Vaughan
(74) *Attorney, Agent, or Firm* — Jared L. Montanaro (57) ABSTRACT

A processor may identify a new application on a device. The processor may receive, from the device, user data. The user data may include user profile information and user activity information. The processor may evaluate the user data. The evaluating of the user data may include designating a security level to the user data. The processor may determine, from evaluating the user data, that a default security configuration for the new application is not secure. The processor may automatically generate a customized security configuration for the new application. The processor may apply the customized security configuration to the new application.

11 Claims, 6 Drawing Sheets

(56) References Cited

U.S. PATENT DOCUMENTS

| | | | |
|---|---|---|---|
| 2015/0207820 A1* | 7/2015 | Klug | H04L 63/107 |
| | | | 726/1 |
| 2017/0244746 A1 | 8/2017 | Hawthorn et al. | |
| 2017/0272468 A1 | 9/2017 | Chechani | |
| 2018/0191770 A1 | 7/2018 | Nachenberg et al. | |
| 2018/0262524 A1 | 9/2018 | Deshpande et al. | |
| 2018/0268149 A1* | 9/2018 | Deras Arreola | H04W 12/08 |
| 2019/0158540 A1 | 5/2019 | Mahaffey et al. | |
| 2019/0318100 A1* | 10/2019 | Bhatia | H04L 63/1425 |
| 2020/0137126 A1* | 4/2020 | Yawalkar | H04L 63/1408 |

FOREIGN PATENT DOCUMENTS

| | | | | | |
|---|---|---|---|---|---|
| CN | 111200815 | A | * | 5/2020 | |
| EP | 2641407 | B1 | * | 1/2017 | G06F 3/048 |
| ES | 2786250 | T3 | * | 10/2020 | G06F 21/57 |
| ES | 2854701 | T3 | * | 9/2021 | G06F 21/57 |
| GB | 2541040 | A | * | 2/2017 | G06F 16/256 |
| GB | 2586044 | A | * | 2/2021 | H04L 63/1408 |

OTHER PUBLICATIONS

Pan et al., "Cognitive Acoustic Analytics Service for Internet of Things," 2017 IEEE International Conference on Cognitive Computing (ICCC), Honolulu, HI, 2017. pp. 96-103 (abstract only).

\* cited by examiner

DYNAMICALLY CUSTOMIZED COGNITIVE SECURITY FILTER

BACKGROUND

The present disclosure relates generally to the field of digital security, and more specifically to automatically generating customized security configurations based on user vulnerabilities.

In most instances, when a new application is added to a computing device, automatic configurations are generically generated and applied. However, many of the generic, automatic configurations incorrectly belong to security parameters. Incorrectly identified security parameters can lead to vulnerabilities in the application and computing device.

SUMMARY

Embodiments of the present disclosure include a method, computer program product, and system for automatically generating customized security configurations based on user vulnerabilities. A processor may identify a new application on a device. The processor may receive, from the device, user data. The user data may include user profile information and user activity information. The processor may evaluate the user data. The evaluating of the user data may include designating a security level to the user data. The processor may determine, from evaluating the user data, that a default security configuration for the new application is not secure. The processor may automatically generate a customized security configuration for the new application. The processor may apply the customized security configuration to the new application.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of digital security, and more specifically to automatically generating customized security configurations based on user vulnerabilities. While the present disclosure is not necessarily limited to such applications, various aspects of the disclosure may be appreciated through a discussion of various examples using this context.

In most computer applications, automatic configurations are generically generated and applied as the computer application is installed on a device (e.g., computer, tablet, smartphone, etc.), and by default, many of these automatic configurations incorrectly belong to security parameters (e.g., account restrictions, accesses to information, security methods for network-related events access, system access etc.). When dealing with security parameters/mechanisms, these automatic configurations can generate vulnerabilities to a user's account, a user's network, or even to the user's device.

Following a real-world example, generally, when a user opens an account on a social network the default setting for the account is a general configuration that allows the user's account to be "public," such that any person can view the user's profile. However, it would be desirable to have a deeper analysis of the user before generically applying a "public" setting. For instance, it may be desirable to take into account the age of the user so that the social network automatically configures the security parameters in a way that prevents the viewability of the user's profile to the public. It may also be desirable to have a means for when a user tries to connect to a remote system, open a call, play an online game, connects to Internet-of-Things (IoT) devices, etc.

Accordingly, explored in embodiments of this disclosure is a method (system and computer program product) to automatically configure security parameters in any computer system based on several features such as, but not limited to: a user profile, a user's digital history, application characteristics, etc. Said disclosed method may improve the quality of security management and the reliability of the minimum parameters required in security mechanisms of an information system, particularly in applications based on sensitive and confidential information (e.g., applications that require personal information, such as a date of birth, social security number, etc.). It is noted that the disclosed method is not restricted only to sensitive applications (e.g., that require personal information, etc.), but also to any other user information management system that requires the implementation of more secure information technology mechanisms.

In some embodiments, security filters are automatically generated, based on a user profile and the application characteristics. Information from the user profile may be obtained from several sources, such as, social networks, web application profiles, daily activities collected from a smart watch, etc. Further, the application characteristics, such as, the functionalities, networks, etc. may be provided by the application itself.

In some embodiments, it is envisioned that the disclosed method includes virtual security groups which rules can be set depending on the group vulnerability level. For instance, video-gamers that are around the world can set a specific filter based on the game itself (e.g., the game isn't allowed access to the video-gamers computing devices if the game is on an open network port, which can lead to a security vulnerability).

Further, in some embodiments, multiple security configurations can be generated for each application on a user device. For example, each security configuration can have a different security parameter set, a different condition set, a different security management set, etc. Each security configuration may then be previewed/displayed to the user and the user is able to decide which security configuration they prefer. Each security configuration can even have a security/vulnerability level rating, for example, one profile could be 80% secure, another could be 90% secure, etc. In other words, what is proposed in this disclosure is a method, where, when installing a new application, the new application is not given generic, default security parameters, rather dynamically, customized security parameters are generated and applied to the new application based on user/application analysis.

As contemplated by the method mentioned above, a processor may identify a new application on a device (e.g., a user's device, a mobile device, a computing device, etc.). The processor may receive, from the device, user data. The user data may include user profile information and user activity information. The processor may evaluate the user data. The evaluating of the user data may include designating a security level to the user data. The processor may determine, from evaluating the user data, that a default security configuration for the new application is not secure. The processor may automatically generate a customized security configuration for the new application. The processor may apply the customized security configuration to the new application.

For example, a user may download a new photo filter application to their mobile phone. The mobile phone my identify that the photo filter application is queued to be installed on the mobile device, but before the photo filter application is allowed to be fully installed, the mobile device may identify that the user is has previously denied camera access to three other applications after they had been installed. The mobile phone may determine from the previous denials, that the user is likely to deny the photo filter application access to the camera, which is a permission that the application asks for by default. The mobile phone may then change the permissions of the photo filter application so that it does not have access to the mobile phone's camera.

In some embodiments, the mobile phone may use the user's prior denials of camera access to determine/evaluate the user's security interests. For instance, if the mobile phone determines that the user has done something twice (e.g., a minimum threshold) the mobile phone will start to automatically incorporate that user preference into security configurations.

In some embodiments, when determining, from evaluating the user data, that the default security configuration for the new application is not secure, the processor may identify, from the user data, that the user profile information includes personal information of a user. The processor may further identify that the default security configuration does not reach a threshold level of security for the personal information of the user.

For example, a user may be downloading a food service application that requires credit card information for use to their tablet. The tablet may identify that the food service application needs the credit card information and identify that the food service application uses SHA-2 encryption for the transactions provided by the credit card, however, the food service application does not hide the numerals of the credit card number. The tablet may then evaluate the protections provided by the food service application, deeming SHA-2 as a 5 on a scale of 1 to 10 when it comes to security, but not hiding the numerals as a 1 on a the scale of 1 to 10. The total security of the food service application being a 6 and not reaching a threshold level of security of 8 on the scale of 1 to 10.

In some embodiments, the threshold level of security may be determined by the user and/or determined automatically by the device based on the user data. For instance, if the user has 2 other food service applications on their tablet and both other applications have the user's credit card information, the tablet may drop the threshold level of security down to 6 as it assumes that that user wants to use the new food service application.

In some embodiments, the processor may receive, from the device, system data. The system data may include network information, device information, and new application information. The processor may evaluate the system data. The evaluating of the system data may include designating a security level of the system data. The processor may determine, from evaluating the system data, that the default security configuration for the new application is not secure.

For example, before being allowed to install a new application on a desktop computer, the desktop computer may identify that it is on a secure home network, has an antivirus installed, and that the new application is from a non-trusted, third-party developer. The desktop computer may determine that although it is on a secure network and has an antivirus that the new application should be restricted access from personal information of a user on the mobile device in order to ensure that that the user is protected (e.g., the new application is not allowed access to user profile information, the user's contact list, email list, etc.).

In some embodiments, when determining, from evaluating the system data, that the default security configuration for the new application is not secure, the processor may identify, from the system data, that the network information indicates that the user is on an unsecured network. The processor may identify that the new application information includes an access to a location of the user. The processor may identify that the default security configuration does not block the new application from distributing the location of the user to other devices on the unsecured network.

For example, an application that is already installed on a user's smartphone may be opened and the smartphone may run a security check. The smartphone may identify that the application utilizes the user's geographic location and that the smartphone is on public Wi-Fi. The smartphone may then block the application from sharing the location of the user with any other applications or process found on the smartphone while it is connected to the public Wi-Fi.

In some embodiments, the processor may analyze the security level of the user data in association with the security level of the system data. the processor may update the customized security configuration for the new application. The updated customized security configuration may include security parameters for both the user data and the system data.

For example, before installing the new application a user's device may determine a security level for the user, e.g., the user does not allow access to their contacts, and the device may set a parameter that the new application cannot access the user's contacts. Next (or in some embodiments, simultaneously), the device may identify that the new application is asking for permissions to analyzes the user's picture gallery. The device may determine, if the user does not want applications having access to their contacts, that they may not want an application to have access to their pictures. Therefore the device may update the security parameters to include denying the new application access to the user's picture gallery.

Figure 2:
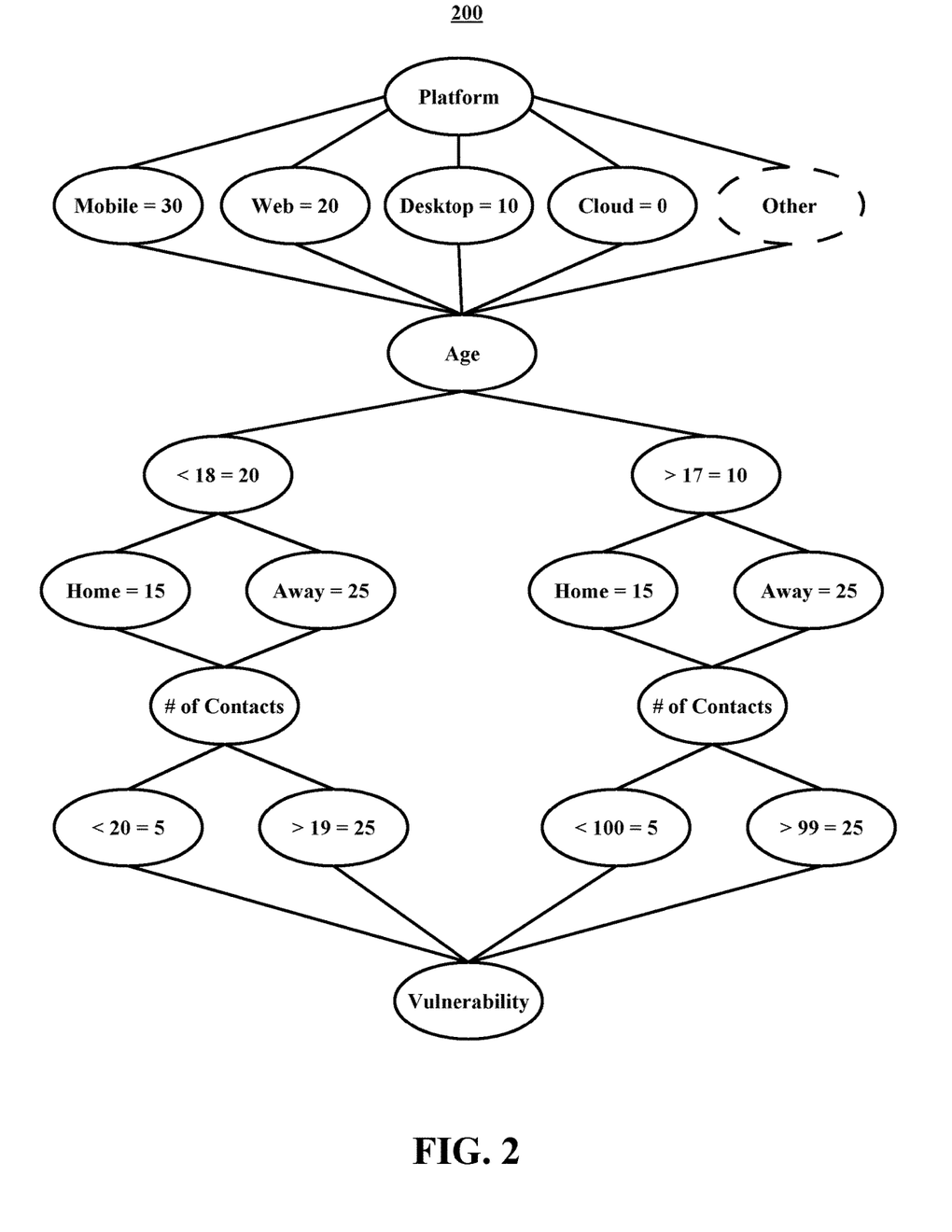
FIG. 2 illustrates an example of a decision tree to be used in a decision tree database, in accordance with embodiments of the present disclosure.

In some embodiments, when analyzing the security level of the user data in association with the security level of the system data, the processor may generate a decision tree (to be discussed more fully in regard to FIG. 2). The decision tree may include two or more levels. The two or more levels may include quantity designations of a vulnerability level of the user profile information, the user activity information, the network information, the device information, and/or the new application information. The processor may identify one or more associations between the user activity information, the network information, the device information, and the new application information. The processor may adapt the quantity designations of the vulnerability levels based on the identified associations. The processor may output an overall security level for the user data and the system data.

In some embodiments, the processor may identify a second new application on the device. The processor may access the user data and the system data. The processor may apply the updated customized security configuration to the second new application. For example, the user may have installed a first social media application to their tablet with a customized set of security parameters. The tablet may identify that a second social media application is being installed and identify that the application is substantially similar to the first social media application and apply the same customized set of security parameters to the second social media application.

Figure 1:
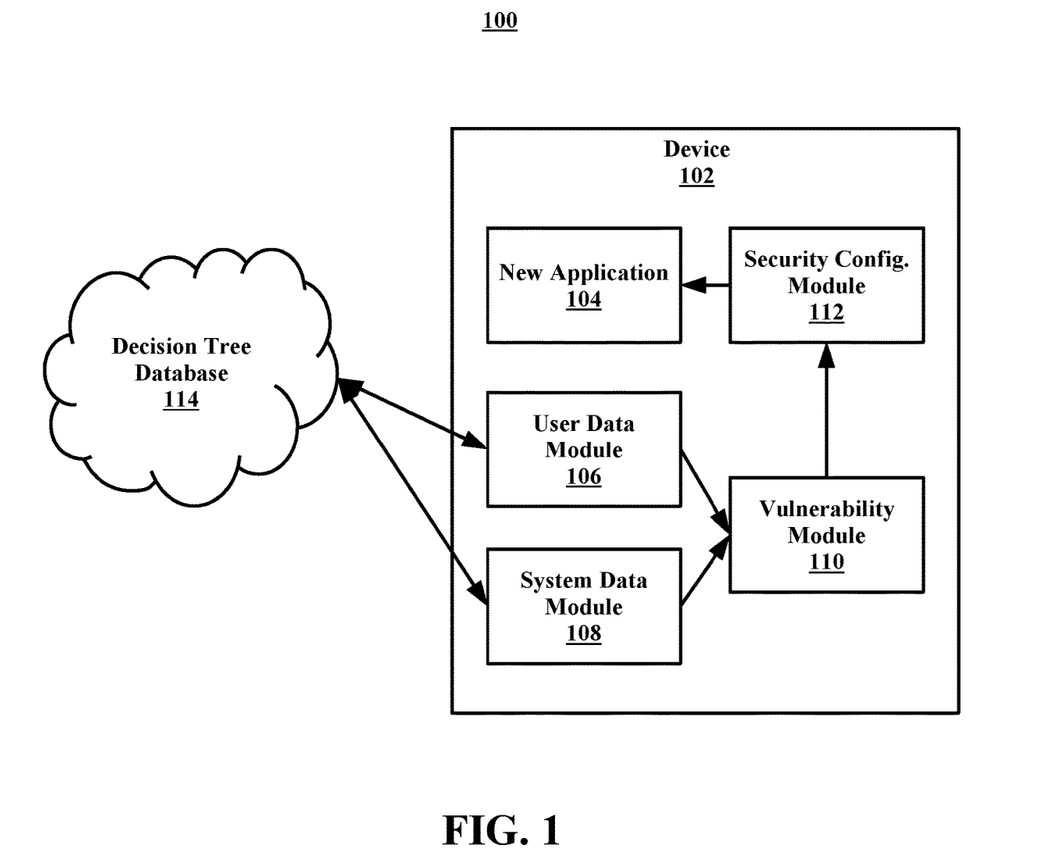
FIG. 1 illustrates an example system for determining a customized security configuration for a new application on a user's device, in accordance with embodiments of the present disclosure.

Referring now to FIG. 1, illustrated is an example system 100 for determining a customized security configuration for a new application on a user's device, in accordance with embodiments of the present disclosure. In some embodiments, the system 100 includes a device 102 and a decision tree database 114. In some embodiments, the device 102 includes a new application 104, a user data module 106, a system data module 108, a vulnerability module 110, and a security configuration module 112.

In some embodiments, the system 100 evaluates a user vulnerability (e.g., online security issues, likelihood of exposing personal data, etc.) depending on the user's behavior and particular characteristics using a daemon on the device 102. In some embodiments, the device 102 identifies that the new application 104 is being installed (or is being opened) on the device 102. The device 102 then accesses the user data module 106 which identifies the user's security risk based on an evaluation of user information/data, which may include but is not limited to the analysis of: default user configurations, user activities, user profile, user website visits, etc.

From the evaluation of the user information done by the user data module 106, a vulnerability/security risk level of the user is determined, e.g., the user is likely to have their information exposed to third-party source 60% of the time they are online, and a user vulnerability score is generated and sent to the vulnerability module 110.

In some embodiments, the user data module 106 utilizes a matrix to determine the user vulnerability score, for example the matrix may look like:

User Risk Matrix

| | User Security Risk | | |
|---|---|---|---|
| User Profile | User Age | Extra Circumstance | No Extra Circumstance |
| | <20 | High Vulnerability | Med. Vulnerability |
| | >20 | High Vulnerability | Low Vulnerability |
| No. of Contacts and User Age | | Extra Circumstance | No Extra Circumstance |
| | >10 and <20 | High Vulnerability | Med. Vulnerability |
| | <10 and >20 | High Vulnerability | Low Vulnerability |

As demonstrated above, for example purposes, the user data module 106 evaluates a user's security risk based on the user's profile, which indicates the age of the user, the number of contacts of the user, and if the user has extra circumstance or not that may increase the vulnerability of the user's online security. For instance, if the user has less than 10 contacts, is over 20 years old and has an extra circumstance, such as they have a management job role, the user data module 106 may identify that they are at a high vulnerability as their information must be more protected as they may have employee information due to their management job role. In some embodiments, the matrix may include an analysis of each combination of the number of contacts and age of the user, e.g., include more than 10 contacts and a user age above 20, and less than ten contacts and a user age below 20.

In some embodiments, after the a user vulnerability score is generated and sent to the vulnerability module 110, the system data module 108 begins an evaluation of system data, e.g., of the system 100 (e.g., network ports, other applications on the device 102, etc.) and/or the new application 104 (e.g., permission accesses, etc.). In some embodiments, a connection type analysis (e.g., network and port evaluation) is performed in addition to an analysis on all system data such as, but not limited to: databases, emails, calls, messages, etc. of the device 102. Further, in some embodiments, an analysis of information type, e.g., sensitive information, not sensitive information, user password, encrypted, not encrypted, etc. is performed by the system data module 108. The system data module 108 incorporates all of the analyses to generate and send a system vulnerability score (e.g., the device 102 is connected to an unknown Bluetooth source and has an 80% chance of being compromised) to the vulnerability module 110.

In some embodiments, the system data module 108 utilizes a matrix to determine the system vulnerability score, for example the matrix may look like:

System Risk Matrix

| System Data | System Security Risk | | |
|---|---|---|---|
| | Security Configuration | Extra Circumstance | No Extra Circumstance |
| | Standard | High Vulnerability | Med. Vulnerability |
| | User Defined | Med. Vulnerability | Low Vulnerability |
| No. of Activities | | Extra Circumstance | No Extra Circumstance |
| | >10 | High Vulnerability | Med. Vulnerability |
| | <10 | High Vulnerability | Low Vulnerability |

As demonstrated above, for example purposes, following the user risk matrix, the system data module 108 evaluates the security risk of system 100 and/or device 102 based on the system information/data, which indicates the security configuration of the system and the number of activities performed by/on the system 100 (e.g., sometimes due in part by the user interacting with the device 102). For instance, if the system 100 is set to a standard configuration and an extra circumstance such as system 100 being on a virtual private network (VPN), the system 100 may be at a high vulnerability to security risks due to the standard security configurations, etc.

In some embodiments, the user data module 106 and the system data module 108 each analyze and evaluate their respective data simultaneously. In some embodiments, both the user data module 106 and the system data module 108 utilize a decision tree that is accessed via the decision tree database 114 (which is to be discussed more fully in regard to FIG. 2). In some embodiments, the decision tree database 114 houses decision trees associated with prior installations of various applications and records and learns from multiple users (e.g., via the cloud, IoT devices, etc.) their preferences in regard to each of the applications, which leads to a specific user having a more secure installation of a new application at subsequent times.

In some embodiments, after receiving both the user vulnerability score and the system vulnerability score, the vulnerability module 110 generates a combined matrix of the user vulnerability score and the system vulnerability score to generate an overall level of vulnerability on the system 100 and/or the device 102. In some embodiments, the overall level of vulnerability may be displayed as a quantifiably score, e.g., a numeral on a scale from 1 to 100; or on a colored scale transitioning from various of green to various shades of red depending on the severity of the vulnerability, e.g., green meaning low/no security vulnerability to red meaning high security vulnerability.

In some embodiments, the example the combined matrix may look like:

Vulnerability Risk Matrix

| User/System Data | User/System Security Risk Assessment | | |
|---|---|---|---|
| | Type of Connection | Extra Circumstance | No Extra Circumstance |
| | Public | High Vulnerability | High Vulnerability |
| | Private | Med. Vulnerability | Med. Vulnerability |
| No. of Activities and User Age | | Extra Circumstance | No Extra Circumstance |
| | >10 and <20 | High Vulnerability | High Vulnerability |
| | <10 and >20 | Med. Vulnerability | Low Vulnerability |
| Type of Data | | Extra Circumstance | No Extra Circumstance |
| | Sensitive | High Vulnerability | High Vulnerability |
| | Non-sensitive | Med. Vulnerability | Med. Vulnerability |

As demonstrated above, for example purposes, following the user risk matrix and the system risk matrix, the vulnerability module 110 evaluates the security risk of system 100 and/or device 102 based on the user information/data and the system information/data, which indicates the vulnerability of system 100 as it is associated with a combination of both the user information and system information. For instance, if a user is less than 20 years old (e.g., user information) and interacts with the device 102 more than 10 times (e.g., system information) in a given period of time (e.g., within 30 minutes, a day, etc.) while on an unsecured network (e.g., system information, extra circumstance), the system 100 may have a high vulnerability to security risks, etc.

In some embodiments, the vulnerability module 110 sends the overall level of vulnerability to the security configuration module 112, which generates customized security configurations to be applied to the new application 104. For instance, if the overall level of vulnerability is low, the security configuration module 112, may allow the new application 104 accesses to each part of the device 102 it asks for. However, if the overall level of vulnerability is high, the security configuration module 112, may restrict the new application 104 access to only necessary parts of the device 102, e.g., only access to user location, camera, etc. In some embodiments, after generating the customized security configurations, the security configuration module 112 applies the customized security configurations to the new application 104.

Referring now to FIG. 2, illustrated is an example of a decision tree 200 to be used in a decision tree database, in accordance with embodiments of the present disclosure. In some embodiments, the decision tree 200 is the decision tree housed in the decision tree database 114 that is utilized by the user data module 106 and the system data module 108 of FIG. 1.

In some embodiments, the decision tree 200 is used to evaluate the user data and the system data and give quantifiable values to indicate a systems security vulnerabilities, e.g., if the system is a desktop it has a vulnerability of 10, and if the desktop is being used by a user that is less than 18 years old (e.g., vulnerability of 20), while on a home network (e.g., vulnerability of 15), the total vulnerably is 45, etc.

As stated previously in regard to FIG. 1, the user data module 106 and the system data module 108 may utilized the decision tree 200 as it is a machine learning tree that utilizes prior information of past applications being installed on the device 102 and/or on other devices in order to generate comprehensive listings of quantifiable vulnerability scores, which can be used by the user data module 106 and the system data module 108 to determine the system 100's overall vulnerability.

In some embodiments, the decision tree 200 is used in conjunction with the matrices presented in FIG. 1 in order to check each group proposed in said matrices, e.g., networks, extra circumstances, etc. It is noted that decision tree 200 can be different each time it is accessed depending on system data, user profile information, application information, etc.

In some embodiments, the decision tree 200 is cloud based in the decision tree database 114, and based on formulas and morphology, the decision tree 200 will be assigned to a system in order to help evaluate the vulnerability of the system. It is noted that making the decision tree cloud based is to increase system accuracy and to allow the posting of automatic configurations to evaluate in the future, which can help establish rules for specific configurations and get the most accurate decision tree to establish the best security filter for a user and/or their system (e.g., the more information decision tree 200 has access to from various users, the more robust it can be and the more accurate the vulnerability suggestions it proposes.

In some embodiments, due to the cloud based nature of the decision tree 200, if a security filter is not working for the user, e.g., if the user's network, system, or any confidential data, has been compromised, then it reports immediately to the decision tree database 114, which will score down that filter as it is associated with that specific user's system characteristics and profile (e.g., user activities and extra circumstances, etc.). In such an embodiment, the system 100 will generate or access another system's decision tree to evaluate vulnerabilities, thus making the decision tree 200 social and dynamic depending on whichever situation it finds itself in.

In some embodiments, the decision tree 200 can be used, or bypassed, depending on prior identified security configurations that were deemed to work for one user. For instance, a gamer may be a part of a gaming party and have the most restrictive security configurations of any individual in the group, e.g., never connect to an unknown port, only use a VPN, etc. The system 100 may apply the security configuration of the gamer to each other individual in the gaming party so that each individual is secure and the gamer does not lose their security due to an outside vulnerability. In such an example, the decision tree 200 can be bypassed or automatically, without in-depth analysis propose vulnerability levels and/or configurations for the system 100 to apply to users of the game.

Figure 3:
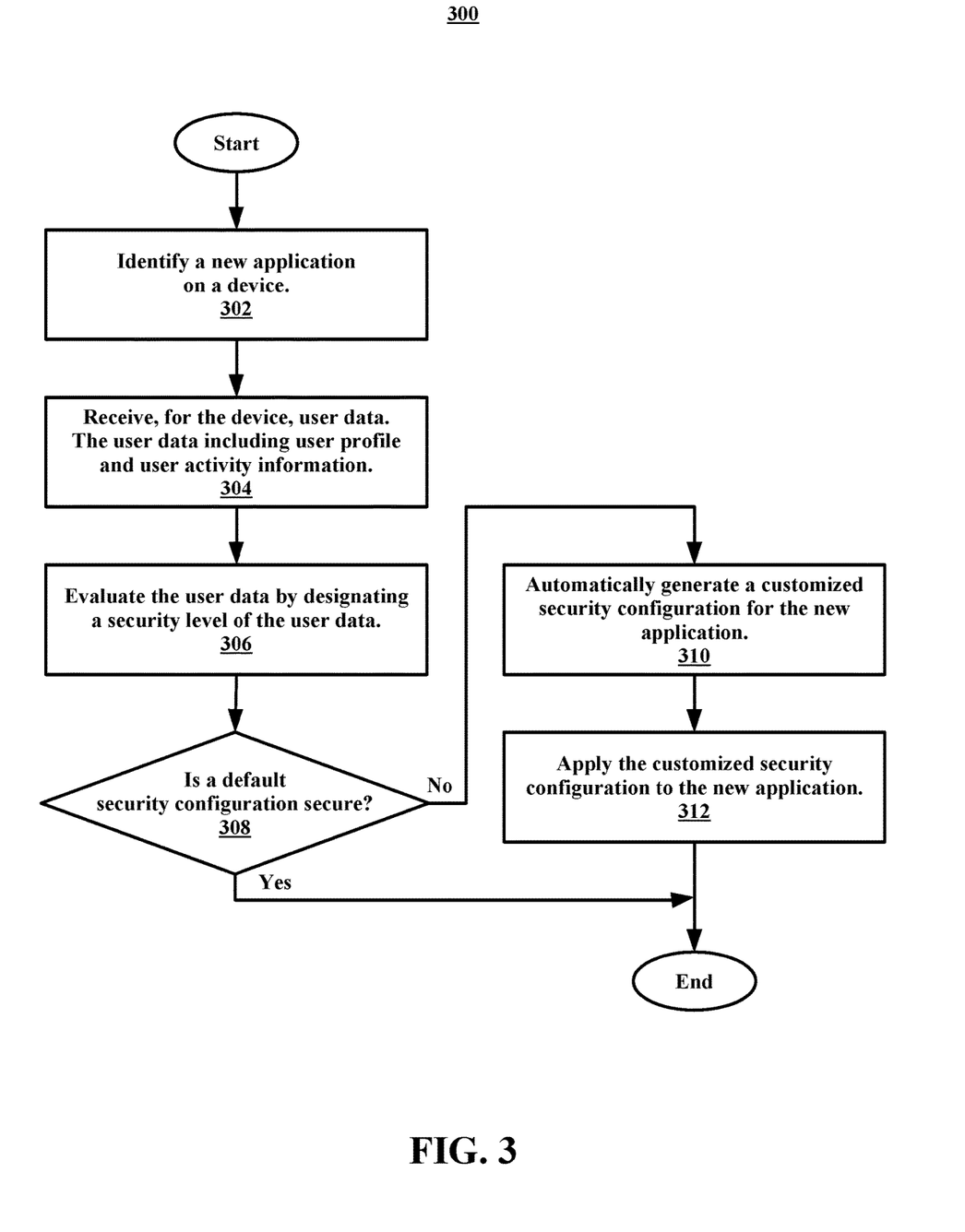
FIG. 3 illustrates a flowchart of an example method for applying customized security configurations to a new application on a user device, in accordance with embodiments of the present disclosure.

Referring now to FIG. 3, illustrated is a flowchart of an example method 300 for applying customized security configurations to a new application on a user device, in accordance with embodiments of the present disclosure. In some embodiments, the method 300 may be performed by a processor in the system 100 and/or the device 102 of FIG. 1.

In some embodiments, the method 300 starts at operation 302. At operation 302, the processor identifies a new application on a device. The method 300 proceeds to operation 304, where the processor receives, from the device, user data. The user data includes user profile and user activity information.

The method 300 proceeds to operation 306. At operation 306, the processor evaluates the user data by designating a security level of the user data. The method 300 proceeds to decision block 308, where it is determined if a default security configuration is secure. If, at decision block 308, it is determined that the default security configuration is secure, the method 300 ends.

If, at decision block 308, it is determined that the default security configuration is not secure, the method 300 proceeds to operation 310. At operation 310, the processor automatically generates a customized security configuration for the new application. The method 300 proceeds to operation 312, where the processor applies the customized security configuration to the new application. In some embodiments, after operation 312, the method 300 ends.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
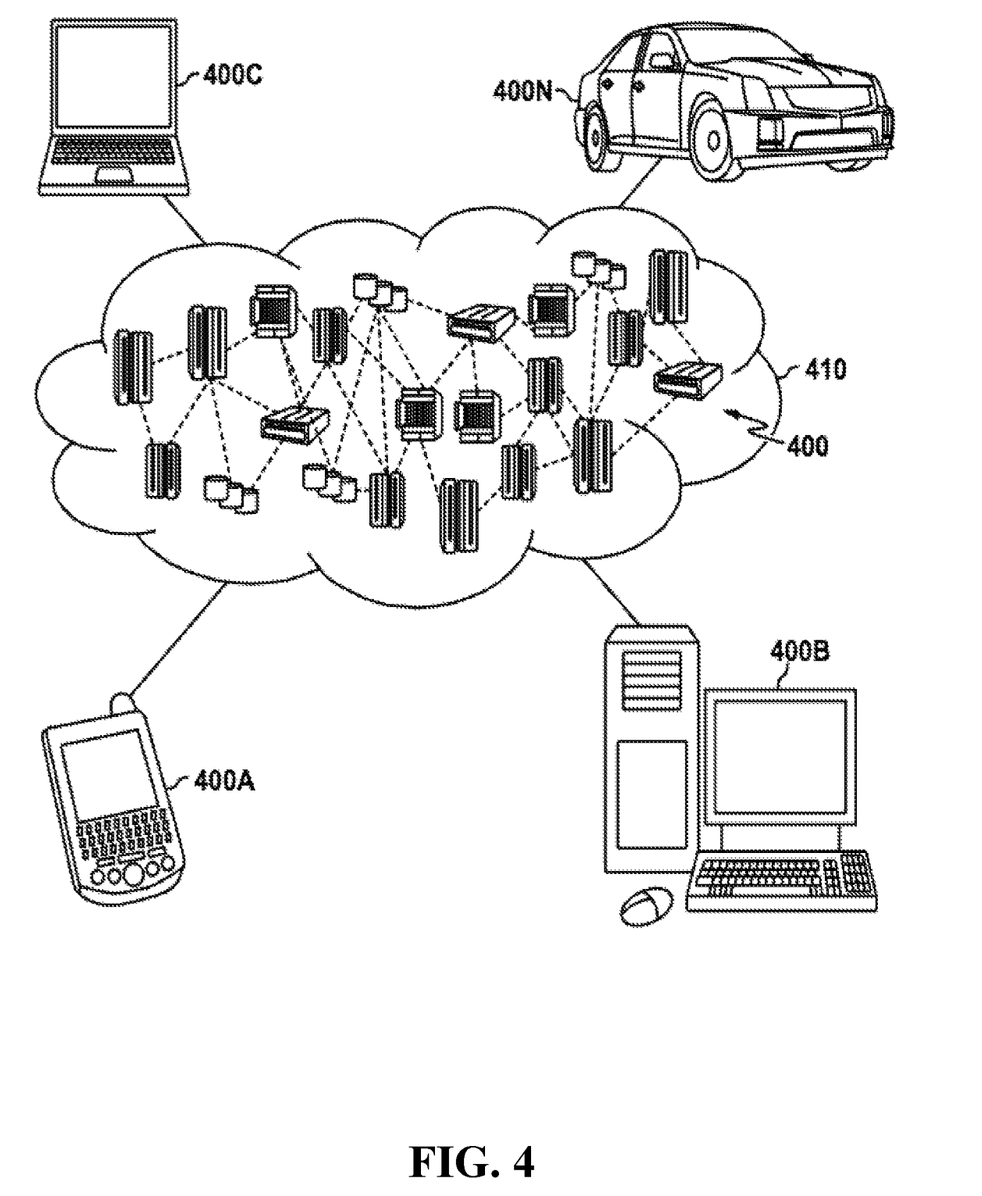
FIG. 4 depicts a cloud computing environment, in accordance with embodiments of the present disclosure.

Referring now to FIG. 4, illustrative cloud computing environment 410 is depicted. As shown, cloud computing environment 410 includes one or more cloud computing nodes 400 with which local computing devices used by cloud consumers, such as, for example, personal digital assistant (PDA) or cellular telephone 400A, desktop computer 400B, laptop computer 400C, and/or automobile computer system 400N may communicate. Nodes 400 may communicate with one another. They may be grouped (not shown) physically or virtually, in one or more networks, such as Private, Community, Public, or Hybrid clouds as described hereinabove, or a combination thereof.

This allows cloud computing environment 410 to offer infrastructure, platforms and/or software as services for which a cloud consumer does not need to maintain resources on a local computing device. It is understood that the types of computing devices 400A-N shown in FIG. 4 are intended to be illustrative only and that computing nodes 400 and cloud computing environment 410 can communicate with any type of computerized device over any type of network and/or network addressable connection (e.g., using a web browser).

Figure 5:
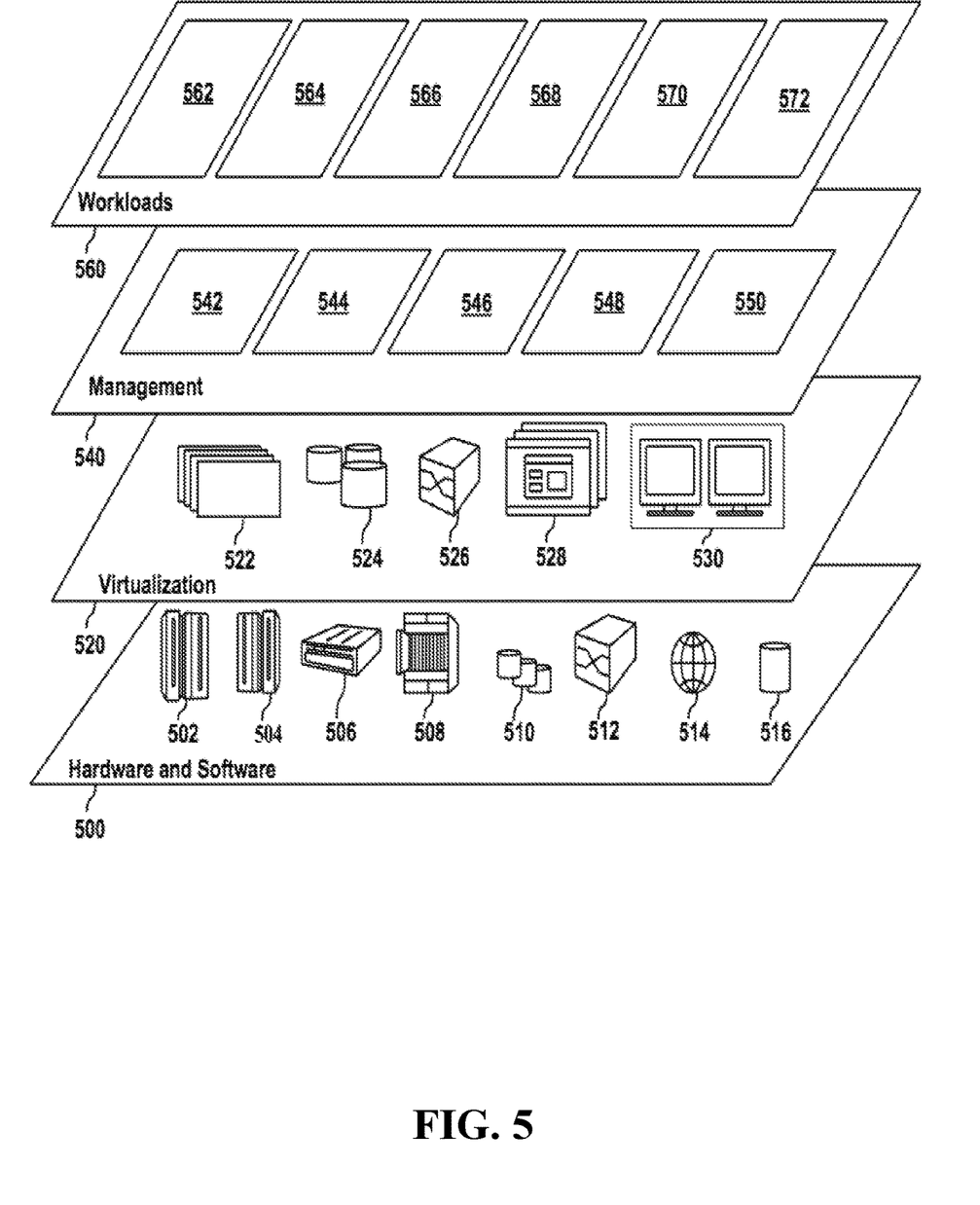
FIG. 5 depicts abstraction model layers, in accordance with embodiments of the present disclosure.

Referring now to FIG. 5, a set of functional abstraction layers provided by cloud computing environment 410 (FIG. 4) is shown. It should be understood in advance that the components, layers, and functions shown in FIG. 5 are intended to be illustrative only and embodiments of the disclosure are not limited thereto. As depicted below, the following layers and corresponding functions are provided.

Hardware and software layer 500 includes hardware and software components. Examples of hardware components include: mainframes 502; RISC (Reduced Instruction Set Computer) architecture based servers 504; servers 506; blade servers 508; storage devices 510; and networks and networking components 512. In some embodiments, software components include network application server software 514 and database software 516.

Virtualization layer 520 provides an abstraction layer from which the following examples of virtual entities may be provided: virtual servers 522; virtual storage 524; virtual networks 526, including virtual private networks; virtual applications and operating systems 528; and virtual clients 530.

In one example, management layer 540 may provide the functions described below. Resource provisioning 542 provides dynamic procurement of computing resources and other resources that are utilized to perform tasks within the cloud computing environment. Metering and Pricing 544 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 546 provides access to the cloud computing environment for consumers and system administrators. Service level management 548 provides cloud computing resource allocation and management such that required service levels are met. Service Level Agreement (SLA) planning and fulfillment 550 provide pre-arrangement for, and procurement of, cloud computing resources for which a future requirement is anticipated in accordance with an SLA.

Workloads layer 560 provides examples of functionality for which the cloud computing environment may be utilized. Examples of workloads and functions which may be provided from this layer include: mapping and navigation 562; software development and lifecycle management 564; virtual classroom education delivery 566; data analytics processing 568; transaction processing 570; and action processing 572.

Figure 6:
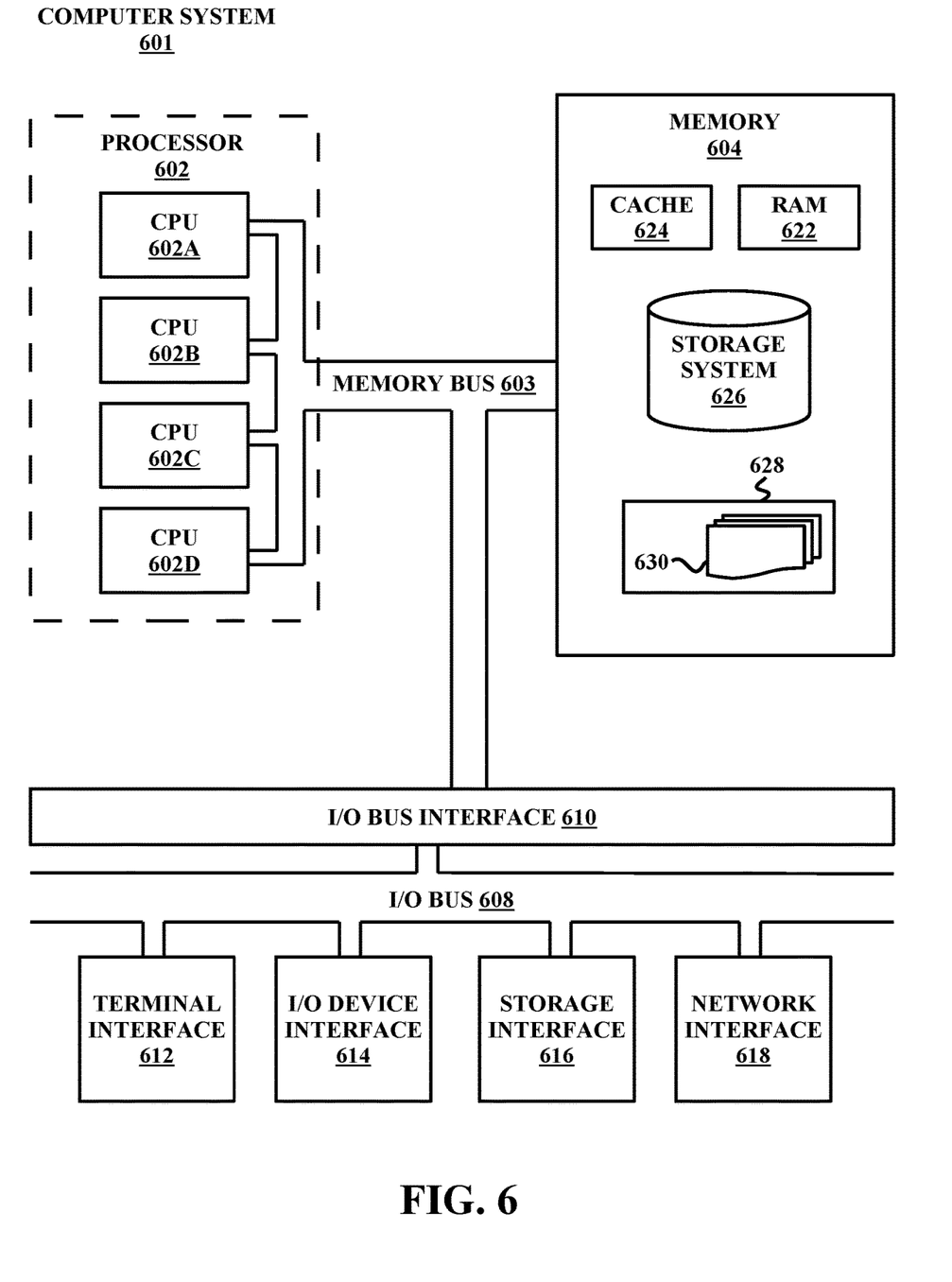
FIG. 6 illustrates a high-level block diagram of an example computer system that may be used in implementing one or more of the methods, tools, and modules, and any related functions, described herein, in accordance with embodiments of the present disclosure.

Referring now to FIG. 6, shown is a high-level block diagram of an example computer system 601 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 601 may comprise one or more CPUs 602, a memory subsystem 604, a terminal interface 612, a storage interface 616, an I/O (Input/Output) device interface 614, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may include one or more levels of on-board cache.

System memory 604 may include computer system readable media in the form of volatile memory, such as random access memory (RAM) 622 or cache memory 624. Computer system 601 may further include other removable/non-removable, volatile/non-volatile computer system storage media. By way of example only, storage system 626 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

One or more programs/utilities 628, each having at least one set of program modules 630 may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 628 and/or program modules 630 generally perform the functions or methodologies of various embodiments.

Although the memory bus 603 is shown in FIG. 6 as a single bus structure providing a direct communication path among the CPUs 602, the memory subsystem 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smartphone, network switches or routers, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method comprising:
   identifying, by a processor, a new application on a device;
   receiving, from the device, user data, wherein the user data includes user profile information and user activity information;
   evaluating the user data, wherein evaluating the user data includes designating a security level to the user data;
   determining, from evaluating the user data, that a default security configuration for the new application is not secure, wherein determining, from evaluating the user data, that the default security configuration for the new application is not secure comprises:
      identifying, from the user data, that the user profile information includes personal information of a user; and
      identifying that the default security configuration does not reach a threshold level of security for the personal information of the user,
   receiving, from the device, system data, wherein the system data includes network information, device information, and new application information;
   evaluating the system data, wherein evaluating the system data includes designating a security level of the system data;
   determining, from evaluating the system data, that the default security configuration for the new application is not secure, wherein determining, from evaluating the system data, that the default security configuration for the new application is not secure comprises:
      identifying, from the system data, that the network information indicates that the user is on an unsecured network;
      identifying that the new application information includes an access to a location of the user; and identifying that the default security configuration does not block the new application from distributing the location of the user to other devices on the unsecured network;

generating, automatically, a customized security configuration for the new application; and applying the customized security configuration to the new application.

2. The method of claim 1, further comprising:

analyzing the security level of the user data in association with the security level of the system data; and updating the customized security configuration for the new application, wherein the updated customized security configuration includes security parameters for both the user data and the system data.

3. The method of claim 2, wherein analyzing the security level of the user data in association with the security level of the system data comprises:

generating a decision tree, wherein the decision tree includes two or more levels, and wherein the two or more levels include quantity designations of a vulnerability level of the user profile information, the user activity information, the network information, the device information, and the new application information;

identifying one or more associations between the user activity information, the network information, the device information, and the new application information;

adapting the quantity designations of the vulnerability levels based on the identified associations; and outputting an overall security level for the user data and the system data.

4. The method of claim 3, further comprising:

identifying a second new application on the device;

accessing the user data and the system data; and applying the updated customized security configuration to the second new application.

5. A system comprising:

a memory; and a processor in communication with the memory, the processor executing instructions contained within the memory in order to perform operations comprising:

identifying, by a processor, a new application on a device;

receiving, from the device, user data, wherein the user data includes user profile information and user activity information;

evaluating the user data, wherein evaluating the user data includes designating a security level to the user data;

determining, from evaluating the user data, that a default security configuration for the new application is not secure, wherein determining, from evaluating the user data, that the default security configuration for the new application is not secure comprises:

identifying, from the user data, that the user profile information includes personal information of a user; and identifying that the default security configuration does not reach a threshold level of security for the personal information of the user, receiving, from the device, system data, wherein the system data includes network information, device information, and new application information;

evaluating the system data, wherein evaluating the system data includes designating a security level of the system data;

determining, from evaluating the system data, that the default security configuration for the new application is not secure, wherein determining, from evaluating the system data, that the default security configuration for the new application is not secure comprises:

identifying, from the system data, that the network information indicates that the user is on an unsecured network;

identifying that the new application information includes an access to a location of the user; and identifying that the default security configuration does not block the new application from distributing the location of the user to other devices on the unsecured network;

generating, automatically, a customized security configuration for the new application; and applying the customized security configuration to the new application.

6. The system of claim 5, wherein the operations further comprise:

analyzing the security level of the user data in association with the security level of the system data; and updating the customized security configuration for the new application, wherein the updated customized security configuration includes security parameters for both the user data and the system data.

7. The system of claim 6, wherein analyzing the security level of the user data in association with the security level of the system data comprises:

generating a decision tree, wherein the decision tree includes two or more levels, and wherein the two or more levels include quantity designations of a vulnerability level of the user profile information, the user activity information, the network information, the device information, and the new application information;

identifying one or more associations between the user activity information, the network information, the device information, and the new application information;

adapting the quantity designations of the vulnerability levels based on the identified associations; and outputting an overall security level for the user data and the system data.

8. The system of claim 7, wherein the operations further comprise:

identifying a second new application on the device;

accessing the user data and the system data; and applying the updated customized security configuration to the second new application.

9. A computer program product comprising a computer readable storage medium having program instructions embodied therewith, the program instructions executable by a processor to cause the processor to perform a method, the method comprising:

identifying, by a processor, a new application on a device;

receiving, from the device, user data, wherein the user data includes user profile information and user activity information;

evaluating the user data, wherein evaluating the user data includes designating a security level to the user data;

determining, from evaluating the user data, that a default security configuration for the new application is not secure, wherein determining, from evaluating the user data, that the default security configuration for the new application is not secure comprises:

identifying, from the user data, that the user profile information includes personal information of a user; and identifying that the default security configuration does not reach a threshold level of security for the personal information of the user;

receiving, from the device, system data, wherein the system data includes network information, device information, and new application information;

evaluating the system data, wherein evaluating the system data includes designating a security level of the system data;

determining, from evaluating the system data, that the default security configuration for the new application is not secure, wherein determining, from evaluating the system data, that the default security configuration for the new application is not secure comprises:

identifying, from the system data, that the network information indicates that the user is on an unsecured network;

identifying that the new application information includes an access to a location of the user; and identifying that the default security configuration does not block the new application from distributing the location of the user to other devices on the unsecured network;

generating, automatically, a customized security configuration for the new application; and applying the customized security configuration to the new application.

10. The computer program product of claim 1, further comprising:

analyzing the security level of the user data in association with the security level of the system data; and updating the customized security configuration for the new application, wherein the updated customized security configuration includes security parameters for both the user data and the system data.

11. The computer program product of claim 10, wherein analyzing the security level of the user data in association with the security level of the system data comprises:

generating a decision tree, wherein the decision tree includes two or more levels, and wherein the two or more levels include quantity designations of a vulnerability level of the user profile information, the user activity information, the network information, the device information, and the new application information;

identifying one or more associations between the user activity information, the network information, the device information, and the new application information;

adapting the quantity designations of the vulnerability levels based on the identified associations; and outputting an overall security level for the user data and the system data.

* * * * *